United States Patent [19]
Piazza

[11] Patent Number: 5,603,011
[45] Date of Patent: Feb. 11, 1997

[54] SELECTIVE SHADOWING AND PAGING IN COMPUTER MEMORY SYSTEMS

[75] Inventor: William J. Piazza, Boca Raton, Fla.

[73] Assignee: International Business Machines Corporation, Armonk, N.Y.

[21] Appl. No.: 342,402

[22] Filed: Nov. 18, 1994

Related U.S. Application Data

[63] Continuation of Ser. No. 989,608, Dec. 11, 1992, abandoned.

[51] Int. Cl.$^6$ .............................. G06F 12/10; G06F 12/02; G06F 9/45
[52] U.S. Cl. .................... 395/497.01; 395/413; 395/419; 395/652
[58] Field of Search .............................. 395/489, 497.02, 395/497.01, 700, 413, 419

[56] References Cited

U.S. PATENT DOCUMENTS

| | | | |
|---|---|---|---|
| 4,403,283 | 9/1983 | Myntti et al. | 395/402 |
| 4,443,847 | 4/1984 | Bradley et al. | 395/405 |
| 4,785,398 | 11/1988 | Joyce et al. | 395/403 |
| 4,899,275 | 2/1990 | Sachs et al. | 395/403 |
| 5,072,411 | 12/1991 | Yamaki | 395/162 |
| 5,091,850 | 2/1992 | Culley | 395/403 |
| 5,193,170 | 3/1993 | Lam | 395/473 |
| 5,202,994 | 4/1993 | Begur et al. | 395/700 |
| 5,210,850 | 5/1993 | Kelly et al. | 395/727 |

*Primary Examiner*—Eddie P. Chan
*Assistant Examiner*—Reginald G. Bragdon
*Attorney, Agent, or Firm*—George E. Grosser; Daniel E. McConnell

[57] ABSTRACT

Principal data (e.g. frequently accessed data such as video BIOS program information and a principal font set) and secondary data (e.g. secondary font sets) are permanently stored in a slow memory device (e.g. EPROM). To improve performance, the principal data but not the secondary data is copied initially to a faster access memory device (shadow RAM). Translating logic associated with the latter device is initially configured to intercept memory requests, having addresses in a range preassigned to the EPROM, and redirect them to shadow RAM. However, in order to allow for access to the secondary data, the redirection function of the translating logic can be disabled and re-enabled, under control of programs running in an associated computer, so that requests in the preassigned address range are routed directly to the EPROM. When the translating logic is disabled, all of the EPROM becomes accessible including locations containing the principal data and locations containing the secondary data. When the translating logic is enabled, only the principal data in the shadow RAM is accessible. The disabling and re-enabling functions are implemented presently by means of unique function calls issuable to system BIOS by operating system, device driver and application programs. In the disclosed embodiment, the size of the principal data is that of a page block, shadow RAM stores the principal data page and only that page, and the capacity of EPROM is sufficient to store the two or more page blocks of (principal and secondary) data.

11 Claims, 10 Drawing Sheets

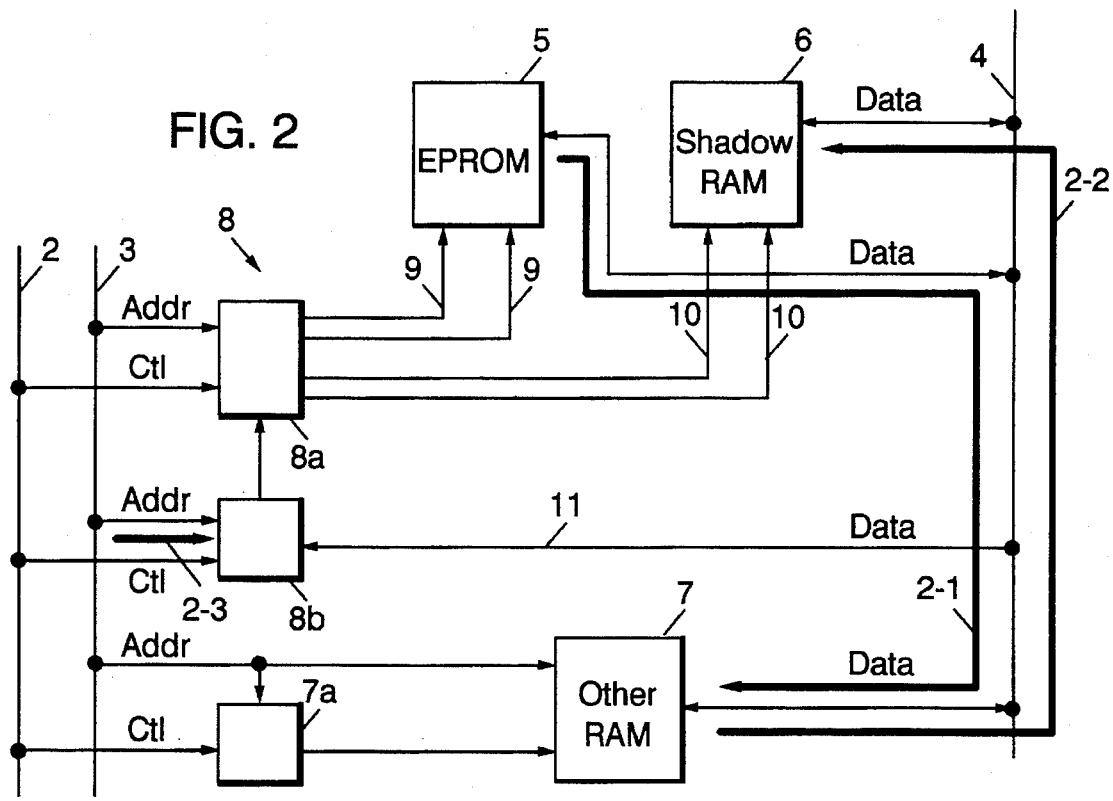
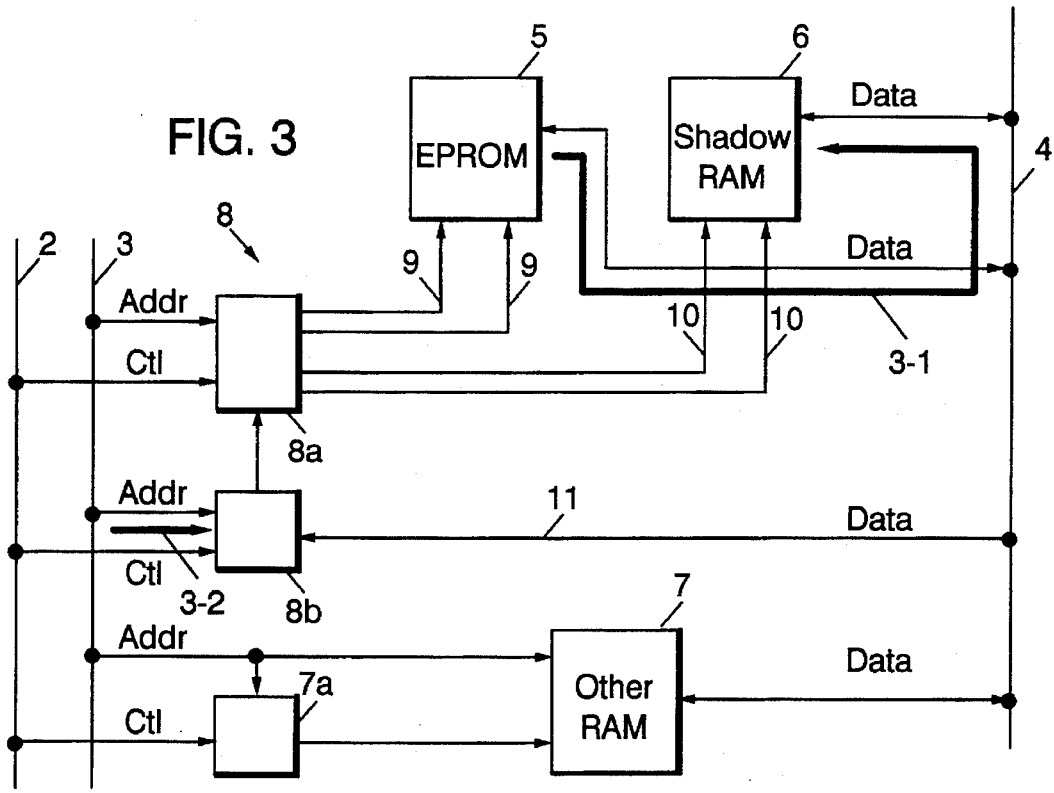

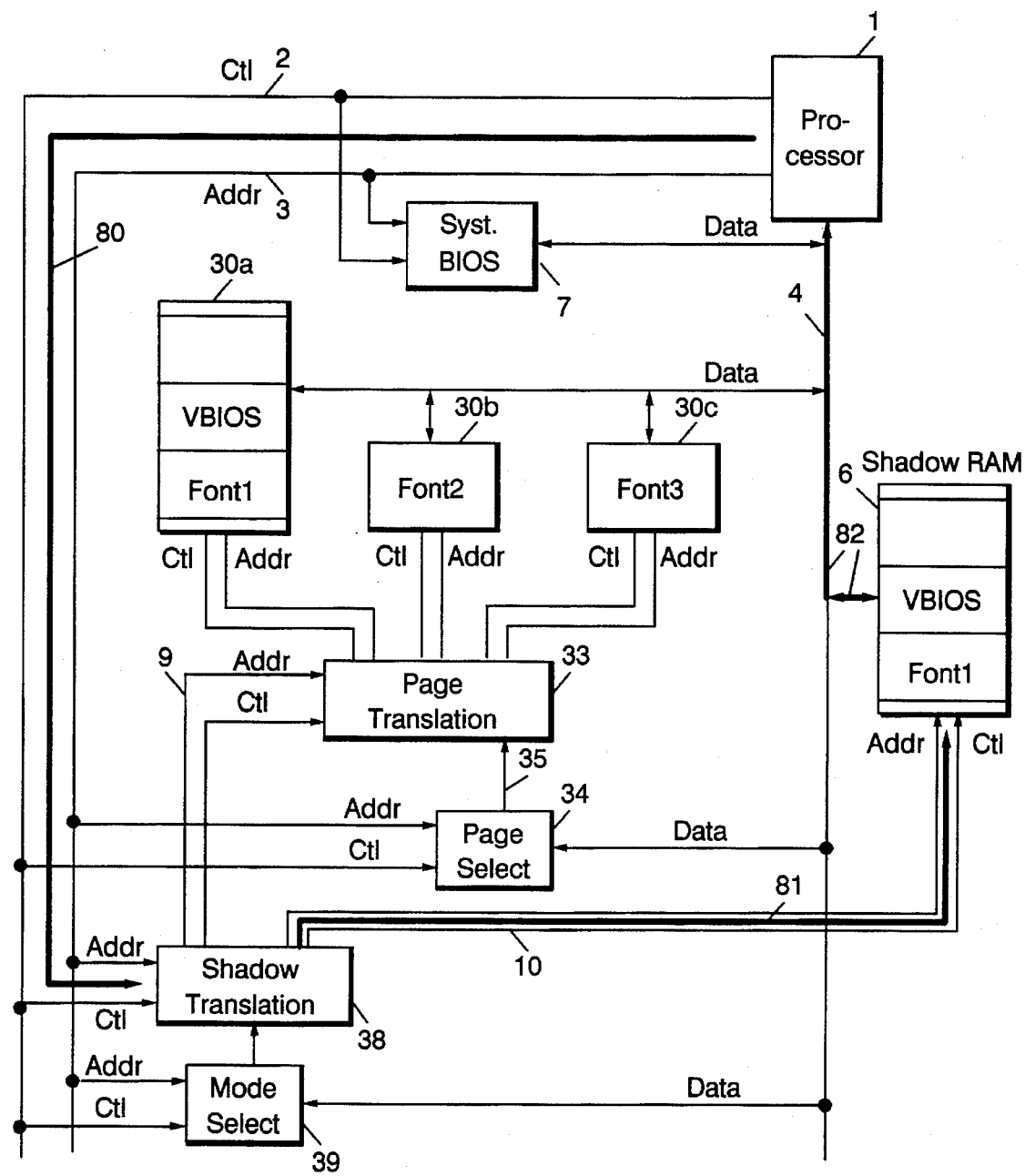

SELECTIVE SHADOWING AND PAGING IN COMPUTER MEMORY SYSTEMS

This is a continuation of application Ser. No. 07/989,608, filed on Dec. 11, 1992 now abandoned.

FIELD OF THE INVENTION

This invention relates to computer memory systems, and particularly to use of potentially incompatible shadowing and paging techniques in such systems.

BACKGROUND OF THE INVENTION

Shadowing and paging are techniques commonly used in computer systems to control access to memory; shadowing to shorten access time to information stored in slow memory devices, and paging to increase addressing capacity relative to systems having memory addressing limitations.

In shadowing, data stored in a slow memory device, such as an EPROM (Electrically Programmable Read Only Memory), is copied to a faster memory device ("shadow RAM") at system initialization. Thereafter, addresses directed to the slow device are redirected to the shadow RAM device, with consequent shortening of access time delays. The address redirection is effected by "shadow" translating logic that is programmed to detect address signals in a range preassigned to the slow device, to translate the detected signals into corresponding address signals associated with the shadow RAM device, and to apply the corresponding address signals along with accompanying control signals to the shadow RAM device. Thus, the slow device is effectively overshadowed by shadow RAM, and the copied data is accessible more quickly through the latter device. Usually, the copied data is data that will be accessed relatively frequently during normal use of the system.

In paging, a many-to-one relationship is established between physical page address spaces in one or more memory devices (where a page is a fixed unit of capacity such as 32K bytes) and a selected "virtual" page space in the memory address space of a computer system. At any instant of time, only one page in the memory device is associated with the selected virtual page, but this association is changeable dynamically by system programs. This page association is effected by page translating logic associated with a (pageable) memory device or unit having plural pages of storage capacity. Such page translating logic is settable, via I/O write operations from a system processor, to effectively map a selected one of the pages in the associated memory device into association with a selected virtual page in the system address space.

Ordinarily, shadowing is established at system initialization (or reset), and used thereafter in an irreversible manner. The invention recognizes that there are instances when it is desirable to be able to use shadowing in a reversible manner, in particular, relative to less than all of the data stored in a slow memory device. Such usage is needed for allowing access to uncopied data in the slow memory, when required by system programs.

A problem solved by the present invention arises when less than all of the data contained in a slow memory device is copied to a faster shadow RAM, and associated shadow translating logic is set to redirect addresses from the slow memory device to the shadow RAM device. This occurs, for instance, when the slow device is used to store data frequently used by system application programs and data not so used, and when only the frequently used data is copied to shadow RAM. In this situation, the frequently used data and infrequently used data could be located in different page storage sections of the slow memory. Without shadowing, all of the data in the slow device is accessible at the characteristic slow rate of that device. With constant shadowing, the data copied to shadow RAM is accessible at the faster rate of that device, but data not copied to shadow RAM could be inaccessible due to the action of the shadow translating logic explained above.

The present invention provides for programmably reversible shadowing to deal with such situations. In programmably reversible shadowing, the shadow translating logic is configured to be toggled between shadowing and non-shadowing modes of operation after system initialization. In shadowing mode, addresses directed to the slow memory device are redirected to shadow RAM, and in non-shadowing mode the same addresses are transferred directly to the page translating controls of the slow device. Thus, in shadowing mode data copied to shadow RAM is quickly accessible, and in non-shadowing mode all data in the slow memory (including uncopied data) is fully but slowly accessible.

A particular application of the invention is useful for shadowed handling of video BIOS (Basic Input Output System) and font data that controls formation of video monitor images in the system. In such usage, a video BIOS program and several fonts are stored in a nonvolatile but slow memory device, such as an EPROM (Electronically Programmable Read Only Memory). At system initialization, the video BIOS program and one of the fonts is copied to a shadow RAM which is then enabled for shadow translation. The copied font is one used by most system applications to display symbols and characters, and the uncopied fonts are required by very few programs. Without the present invention, the shadow translating logic would be constantly enabled for shadowing, so that these other fonts would be inaccessible. The present invention provides an efficient basis for providing occasional access to these other fonts.

The expedient of having all of the fonts copied to shadow RAM was considered but rejected as impractical or inefficient. It would require storage in shadow RAM of fonts which might never be used in some systems, it would require modification of shadow translating logic to include paging capability (assuming the fonts are stored in different EPROM pages), and in general it would tend to unduly increase the costs of shadowing. Furthermore, such shadowing might be completely unfeasible relative to a memory arrangement in which access to shadow RAM is managed by a semiconductor chip lacking page translation capability, and paged access to an associated EPROM is managed by another chip made by a different manufacturer.

With the present invention, this problem is eliminated. The shadow RAM is configured for shadowing less than the entire content of a slow memory, while the shadow translating logic is configured to permit the system, during its normal programmed operations, to reversibly toggle that logic to non-shadowing mode, and thereby allow for post-initialization access to uncopied data in the slow memory (when such access is needed by a particular system application or system user).

OBJECTS OF THE INVENTION

An object of the invention is to provide a mechanism and associated method for enabling programs running on systems initialized for shadowing to control the shadowing function so as to allow such programs to gain access to unshadowed data stored in a slow memory device.

Another object is to provide a shadowing arrangement and associated access method for providing a programmable data processing system with fast access to data in a shadow RAM, which data represents a copy of part of the data stored in a slow access memory device, while preserving capability to provide the system with direct access to other data stored in the slow device.

Another object is to provide a shadowing arrangement as just characterized, in which shadow translating logic associated with the shadow RAM can be dynamically toggled between shadowing and non-shadowing states of operation, under control of programs running in the data processing system; wherein the shadowing state allows the system to directly access data in shadow RAM and the non-shadowing state allows the system to directly access data in a slower memory device which contains both a copy of data held in the shadow RAM and other data.

A related object is to provide a shadowing control mechanism and associated method as in the preceding object, in which the data stored in the slower memory device is stored in plural sections of that device which are accessible only by paging, and in which the non-shadowing state allows the processing system to obtain access to a page in the slower memory which contains data not copied in the shadow RAM.

Another object is to provide an efficient arrangement for providing system access to video BIOS program information and associated font data stored in a system's memory, wherein: 1) the video BIOS information and a principal set of font data are stored in one page section of a nonvolatile slow access memory adapted for paged access; 2) one or more secondary sets of font data are stored in other pages of the slow memory; 3) a copy of only the video BIOS information and the principal font set is stored stored in a fast access shadow RAM; and 4) the logic controlling access to the shadow RAM and slow memory is adapted to be controlled by the system so as to permit the system to have optional fast access to the data stored in the shadow RAM or slow access to the secondary font data stored in the slow memory.

SUMMARY OF THE INVENTION

The present shadowing arrangement provides a computer system with programmably selectable options of fast and slow access to data stored in memory. Principal data (data frequently needed by system programs) is stored in a shadow RAM device, and the same data and other secondary data are stored in a non-volatile memory device having longer access delay/latency than the shadow RAM. Shadow translation logic associated with both memory devices is adapted to be switched between shadowing and non-shadowing modes by programmed I/O operations of a system processor. In shadowing mode, system memory access requests directed to the slower memory are redirected to shadow RAM by the shadow translation logic. In non-shadowing mode, system memory access requests directed to the slower memory are routed directly to that memory by the shadow translation logic.

Typically, principal data is data to which many system programs are likely to have frequent reference during most operating sessions of the system (where an operating session as used here means a time from when system power is turned on to when it is next turned off). Secondary data, typically, is data to which few system programs are likely to have reference during most operating sessions (and data which systems lacking the few programs may never use).

In shadowing mode, the principal data is accessible to the system processor relatively quickly, via the shadow RAM, but the secondary data is inaccessible. In non-shadowing mode both the principal data and the secondary data are accessible relatively slowly via the slower memory device.

The shadow RAM may be a volatile device, and in that case the principal data is copied to it from the slower memory when the system is either initialized or reset. The slower memory—e.g. an EPROM (electronically programmable read-only memory—stores both the principal data and secondary data.

The shadow translation logic is adapted to operate in one or the other of two logical states, an enabled/shadowing state and a disabled/non-shadowing state, and to be toggled between these states in response to programmably originated signals from the system processor. In enabled state, this logic intercepts signals directed to the slower memory and redirects them to shadow RAM. In disabled state, the logic allows such signals to flow directly to the slower memory.

In accordance with the invention, the shadow translation logic is set to its enabled state when the system is initialized, and the principal data is or has been stored in shadow RAM, and thereafter toggled reversibly between enabled and disabled states under the direction of programs running on the system processor. in a preferred embodiment, these programs effect such toggling actions by means of specific shadow enabling and shadow disabling function calls to a system BIOS (Basic Input-Output Service) program, or the equivalent. The system BIOS controls Input-output functions of the respective system processor at a primitive level, and these function calls result in transfers of signals directed specifically to the shadow translation logic. As presently contemplated, these function calls can be made by application programs, device driver programs, and operating system programs. Their programmed context of application, for the foregoing toggling function, are considered unique and novel aspects of the present invention.

As noted above, if shadow RAM is volatile, the principal data is copied to it at system initialization (or reset). The original of that data is stored in the slow memory along with the secondary data (that is not copied to shadow RAM). Typically, the slow memory is organized for paging, has associated page translating logic which steers accesses to individual page locations, and holds the original of the principal data and the secondary data in different pages. The associated page translating logic is set to a given page selection state, in a system I/O operation, by programmably originated signals from the system processor. However, the page selecting state of the page translating logic is transparent to the shadow translation logic, so that the latter when enabled would redirect signals to the shadow RAM that are effectively directed to any page in the slower memory; and thereby redirect signals that could be directed to either principal or secondary data. Accordingly, the secondary data effectively is inaccessible while shadow translation is enabled, and the toggling function of the invention must be invoked to make that data available when it is needed by system programs.

In a presently disclosed specific example of the type of data to which this arrangement can be advantageously applied (other examples will readily be inferred by those skilled in the art), the principal data mentioned above is represented by video BIOS program (or subroutine) and a principal font code. The video BIOS program is used to control the creation of display monitor images, and the principal font code is used to define a specific set of character and symbol attributes in such images. The secondary data consists of several other font codes having secondary usage in the system (less frequent reference than the principal font code by most system programs or having fewer associated system programs than the principal code).

At system initialization, the video BIOS program and principal font code are stored in the shadow RAM, and shadow translation is enabled. Programs which thereafter seek to retrieve this principal data direct memory references to associated locations in the slower memory and these are redirected to the shadow RAM by the shadow translation logic. Thus, the principal data is retrieved more quickly than it would be if read from the slower memory. If a system program requires access to one of the other font codes stored in the slower memory, it instigates a shadow disabling function call to system BIOS causing an output signal to be directed to the shadow translating logic setting that logic in disabled state. All memory references to the slower memory are then routed directly to that memory, and the program invokes page selecting functions relative to the page selection logic of the slower memory to obtain access to either principal or secondary data in that memory. When that usage is concluded, the same program or another program (e.g. an operating system supervisory function) instigates a shadow enabling function call to have system BIOS restore the shadow translating logic to enabled state.

The above and other features, objects, effects, and potential applications and advantages of the invention may be more fully understood and appreciated from the following description and claims.

BRIEF DESCRIPTION OF THE DRAWINGS

FIG. 2 is a schematic block diagram used to explain a two-stage technique for initializing the system of FIG. 1 for shadowing.

FIG. 3 is a schematic used to explain an alternate one-stage technique for initializing the system of FIG. 1 for shadowing.

FIG. 6A is used with FIG. 2 for describing the two-stage technique. FIG. 6B is used with FIG. 3 for explaining the one-stage technique.

FIG. 10 is a view of the system of FIG. 5 showing primary signal paths when shadowing is disabled.

DETAILED DESCRIPTION OF PREFERRED EMBODIMENT

1. System Environment And Problem Solved By The Invention

Figure 1:
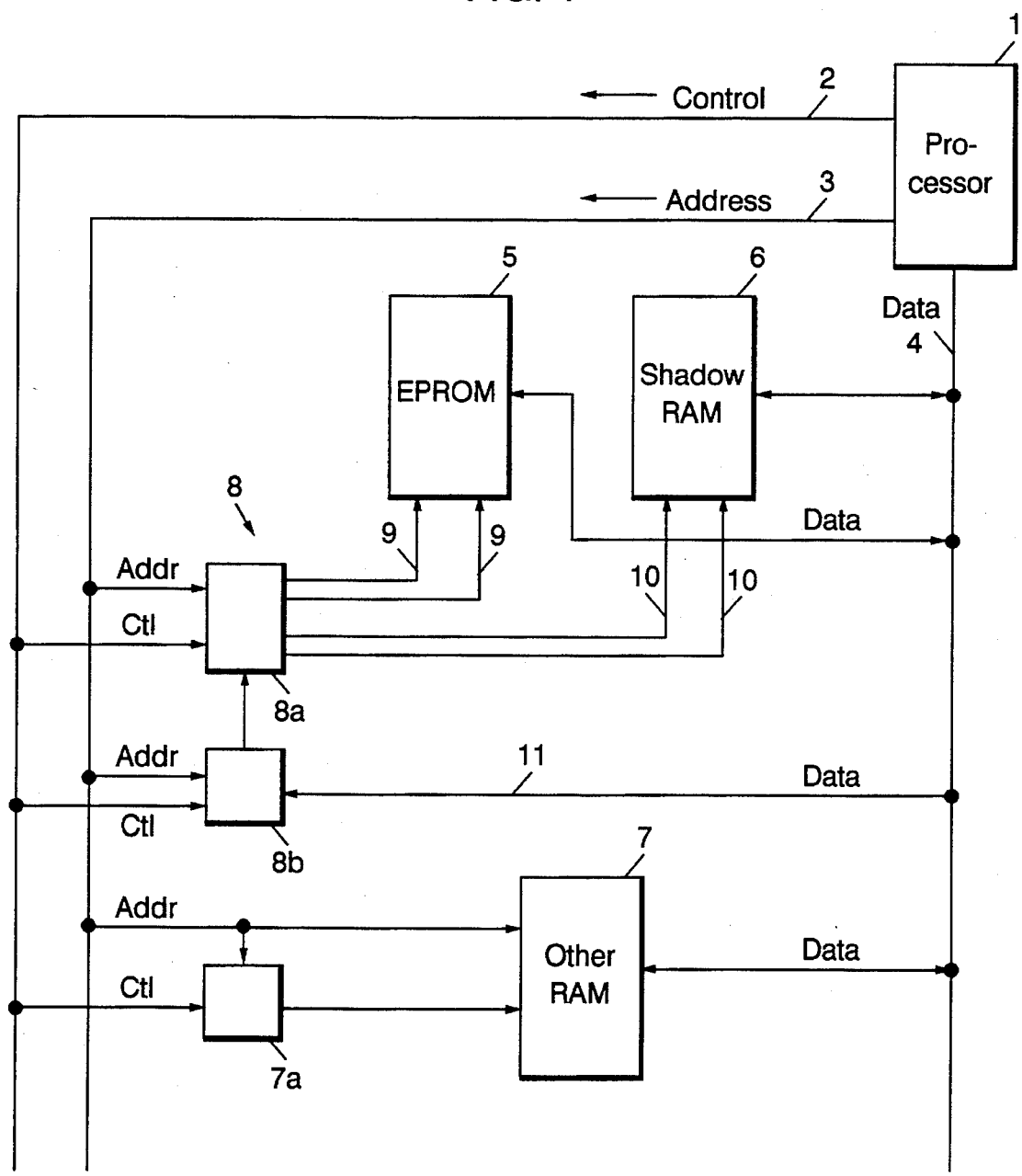
FIG. 1 is a schematic block diagram of a computer system adaptable for shadowing in accordance with the present invention.

FIG. 1 shows a typical system environment to which the subject invention applies. System processor 1 connects, via bus lines 2-4, to random access memory (RAM) devices 5-7, and potentially to other devices (e.g. not-shown peripherals). Devices 5-7 constitute all or part of a memory subsystem.

Device 5, shown as an EPROM (electronically programmable read only memory), is non-volatile (retains its information when system power is turned off). It is also the slowest of devices 5-7; i.e. it has the longest access delay/latency of these devices. RAM 6, which is configured for use as a shadow RAM relative to device 5, is volatile (loses its data when power is removed). It is also the fastest of the three devices; i.e. has the shortest access delay. RAM 7 has only ancillary relevance to the present invention.

Lines 2-4 conduct signals having different functional significance, between processor 1 and attached devices. Lines 2 conduct control signals representing operation requests. Such signals originate at processor 1 or an alternate bus master; e.g. at not-shown DMA (direct memory access) control logic programmed by the processor. Lines 3 conduct address signals originated by the processor (or alternate bus master). Lines 4 conduct data signals between the processor (or alternate bus master) and devices attached to the bus.

Request signals on lines 2 call for data transfer operations such as: memory read/fetch, memory write/store, I/O read and I/O write. Memory read and write transfers are conducted relative to memory devices such as 5-7. I/O read and write transfers are conducted relative to other devices, including access control logic associated with memory devices (as described below). Address signals on lines 3 effectively designate a device which is the source or destination of data for data transfer requests concurrently signalled on lines 2. In respect to memory transfer requests, the address signals also designate a specific storage address location, in the respective source or destination device, as a source or destination position for the respective transfer. Lines 4 conduct data signals bidirectionally, between the request source and the addressed memory location or I/O device.

Although lines 2-4 are each shown by a single drawn line, each in fact may include multiple signal conducting lines for transferring bit signals in parallel. Hence, in the foregoing and following discussions, each is referred to as "lines". When operating under the above-mentioned DMA control, bus 2-4 also may be used for transferring data directly between attached devices (e.g. memory to memory, memory to peripheral, peripheral to memory, peripheral to peripheral, etc.). In such "inter-device" data transfers, the DMA logic directs request and address signals alternately to source and destination devices, whereby data furnished by the source device is transferred to the destination device and stored by the latter device (in an addressed location, if the destination is memory).

Characteristics of EPROM (low cost, non-volatility, writeability, etc.) make it attractive for use as an initial source of certain "principal" data; e.g. the video BIOS information and principal font code mentioned earlier. However, the relatively long access delay/latency of such devices make them inefficient for use during ordinary programmed operations of the respective computer system in which frequent references to the principal data would tend to retard system throughput or productivity. Therefore, it is conventional to use shadowing techniques to reduce throughput delays during such ordinary operations.

Conventionally, shadowing is employed in a static manner. The shadow RAM is initialized with data that represents a copy of all data in the slow memory, and all subsequent requests that are addressed to the slow memory are redirected to shadow RAM. Since all of the data in the slow memory is fully accessible through such redirection, there is no need to provide for access to the slow memory after initialization.

A problem recognized presently is that there are circumstances in which it is economically useful to have slow memory (e.g. a paged EPROM) store principal and secondary data, and initialize shadow RAM to store a copy of only the principal data. For example, if the principal data comprises display control information mentioned earlier (i.e. video BIOS information and a principal font likely to be frequently accessed during normal system use), and the secondary data comprises secondary fonts less likely to be used normally, it would be inefficient and potentially impractical to have all such data copied to shadow RAM. However, in a shadowed memory configuration of this sort, the secondary data would be effectively inaccessible if shadowing is maintained constantly in effect (enabled). This is because accesses to all pages in slow memory are being redirected to shadow RAM, while shadowing is enabled. The present invention addresses this problem, and provides an efficient mechanism for adapting a system to use shadowing relative to principal data, while allowing for system programs to gain access to secondary data in the slow memory when such access is needed.

RAM 7 represents additional memory capacity which may not be directly used for shadowing, but as explained later it may be used as an intermediate buffer store during initial copying of data to prepare for shadowing. RAM 7 has address decoding controls shown at 7a. Devices 5 and 6 have associated shadow translation control circuits shown at 8. Circuits 8 include translation control logic 8a and selection logic 8b. Logic 8a is operable in enabled and disabled modes determined by respective enabled and disabled selection states of logic 8b.

States of logic 8b are settable by processor 1 by means of programmed I/O write operations described below. When logic 8b is enabled, requests directed to EPROM 5 are redirected to shadow RAM. When logic 8b is disabled, requests directed to EPROM 5 are routed directly to that device.

2. Operation Of The Environmental System In Accordance With The Invention

In accordance with the present invention, EPROM 5 is used to store principal and secondary data, and shadow translation logic circuits 8a and 8b are positioned between bus 2-4 and memory devices 5 and 6 to provide presently needed "reversible" shadow translation effects under programmed control from processor 1, in order to allow programs running on processor 1 to have fast access to principal data when only that data is needed, and slow access to either principal or secondary data when access to secondary data is needed.

As noted earlier, logic 8a operates in either a shadowing/enabled or a nonshadowing/disabled mode determined by states set into logic 8b. In simplest form, logic 8b is a flip-flop or logical toggle switch, having enabling and disabling states that are selectively settable by system programs after initialization of the system. Logic 8b is switched between state settings by means of programmed I/O requests issuable by processor 1 (i.e. I/O write requests accompanied by address signals specifically addressing logic 8b, and by data signals to be stored by logic 8b).

While logic 8b is in disabled state, circuits 8a operate in disabled mode; i.e. they detect address signals on lines 3 within a range preassigned to EPROM 5, and pass the same address signals unaltered to EPROM 5, along with accompanying request signals received on lines 2. Signals so passed are transferred to EPROM 5 via extension control and address lines collectively shown at 9 in FIG. 1. Accordingly, in this state, information (primary or secondary) stored anywhere in EPROM 5 is accessible directly to programs running on processor 1, but at the relatively slow access rate characteristic of the EPROM.

While logic 8b is in enabled state, circuits 8a operate in enabled mode; i.e. requests received via bus lines 2 and 3 that are directed to EPROM 5, are redirected to shadow RAM 6. In such redirection, received addresses are translated into addresses in a range preassigned to RAM 6, and the translated addresses and associated requests are routed to RAM 6 via extension request lines 10 (FIG. 1). Since RAM 6 when used in accordance with the invention contains a copy of only the principal data part of the data stored in the EPROM, only the principal data is accessible while this state is in effect.

3. System Initialization For Shadowing

Presently, it is assumed that shadow RAM 6 is volatile, so that a part of the initialization process involves copying data from EPROM 5 to RAM 6, and another part of the process involves manipulating states of logic 8b. Two initialization techniques are described below. One is a two-stage ("indirect copying") process in which data being copied is transferred first from EPROM 5 to RAM 7, and then from RAM 7 to RAM 6. The other is a one-stage process ("direct copying") in which data being copied is transferred directly from EPROM 5 to RAM 6. Indirect copying is described with reference to FIGS. 2 and 6A, and direct copying is described relative to FIGS. 3 and 6B.

Each technique is used only when system power is turned on or a system reset occurs, and is implemented by software which may be incorporated in the power on self test (POST) procedure or equivalent bootstrapping process.

As applied in non-conventional context, each technique serves to copy less than all of the data in EPROM 5 to shadow RAM 6 (usually a page or less of data in a paged EPROM containing other useful data that is not copied), and leaves logic 8a, 8b enabled for shadowing but available for program directed reversal to disabled state.

3a. Indirect Copying (FIGS. 2 and 6A).

In indirect copying, data (generally, a "principal" portion of data consisting of "principal" and "secondary" portions) is moved from EPROM 5 to RAM 7, and then from RAM 7 to RAM 6, along paths indicated respectively by heavy lines 2-1 and 2-2 in FIG. 2. System operations preparing for these transfers and directing them are indicated in FIG. 6A. In preparation, system hardware performs a reset action 15 (FIG. 6A) which disables shadow translation logic 8 (FIG. 1); so that subsequent requests addressed to EPROM 5 will be routed directly to that device. As suggested at 16 (FIG. 6A), if EPROM 5 is configured for paging, the reset hardware connections are configured to set page translation logic associated with the EPROM (which logic is described later relative to FIG. 4) to a predetermined page selecting state associated with a page in which the principal data is stored.

Figure 6A:
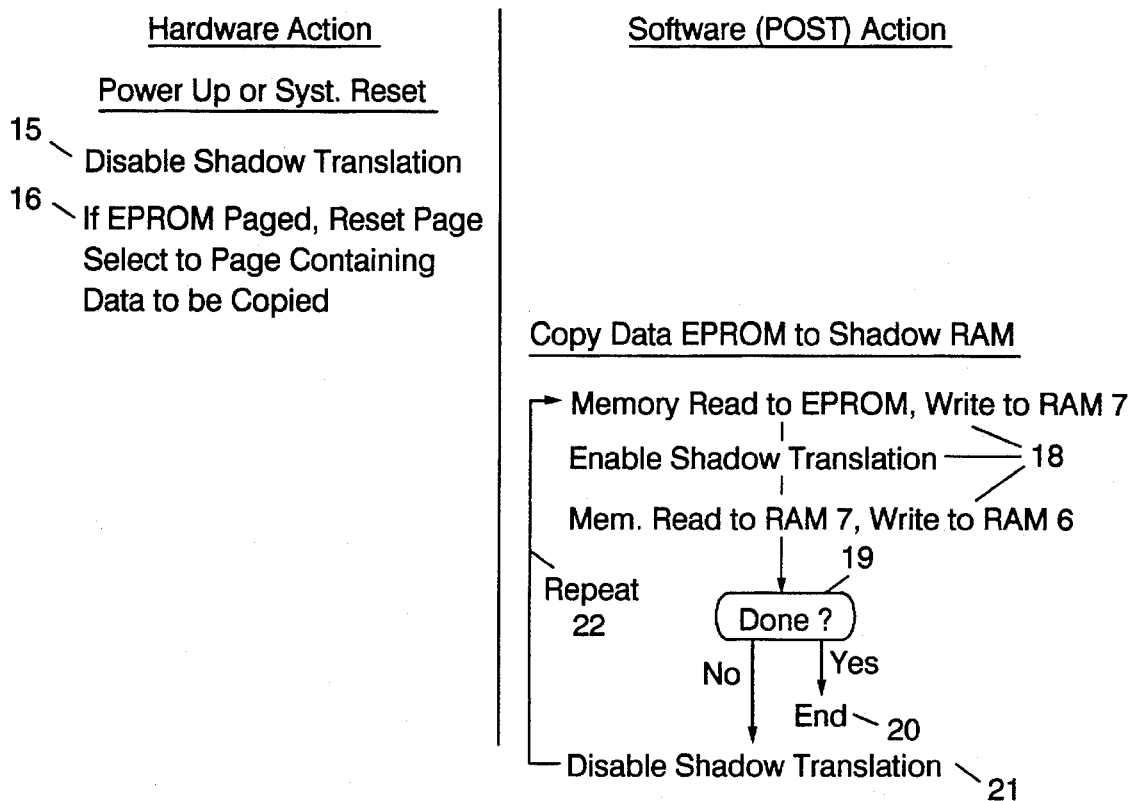
FIGS. 6A and 6B are diagrams illustrating alternate two-stage and one-stage techniques for initializing shadowing in the system of FIG. 1.

Following these hardware instigated actions, the system processor, operating under control of a "shadow copying" program, performs a series of actions indicated at 18 (FIG. 6A). This shadow copying program may be integrated into the POST (power on self test) program responsible for system initialization, as an integral subroutine of that program. In operations 18, data is transferred from EPROM 5 to RAM 7, then logic 8b is enabled, and then data is transferred from RAM 7 to RAM 6 via the redirection action of logic 8a in enabled mode.

In the transfers from EPROM to RAM 7, memory read requests are directed to the EPROM, causing data to be read out of that device, and memory write requests are directed to RAM 7 causing the same data to be stored in predetermined locations of RAM 7. Depending upon the logical capabilities of the system, the data may be either transferred directly from EPROM to RAM 7, or it may be transferred from EPROM to (buffers in) processor 1 and from processor 1 to RAM 7. The data may be in whatever parallel units bus lines 4 can handle (e.g. a word at a time).

In the transfers from RAM 7 to RAM 6, read requests to RAM 7 cause data to be read out of RAM 7, and write requests to EPROM cause the same data to be redirected and written to RAM 6. As noted above, depending upon the logical capabilities of the system, the data so transferred may be passed either directly between the RAM's or it may be read from RAM 7 to (buffers in) processor 1 and written from the processor to RAM 6.

As shown at 19 (FIG. 6A), when a series of write transfers to memory 6 is finished, the system determines if the copying function is "done"/completed; i.e. if all principal data has been transferred. As shown at 20 (FIG. 6A, if the entire transfer is completed, the copying subroutine concludes, leaving the shadow translation logic 8a, 8b in the enabled state induced during operations 18. If the transfer process is incomplete, further operations 21 and 22 (FIG. 6A) are instigated to have actions 18 repeated relative to more principal data. In operation 21, the shadow translation logic is disabled (by a programmed function call to system BIOS that is described later). In operation 22 the subroutine associated with actions 18 is re-entered to have those actions repeated relative to more principal data.

Thus, the subroutine iteratively performs actions 18, 21, and 22 until all of the principal data has been transferred.

The shadow translation enabling function of operations 18, and disabling function of operation 21, are carried out by means of "shadow enabling" and "shadow disabling" function calls from the copying subroutine to system BIOS. These function calls, which can also be made by system software after initialization (e.g. by operating system, device driver or application software), are described later. These calls are dealt with as system program interruptions, and passed to a system BIOS subroutine which carries out necessary actions relative to logic 8b; i.e. issues I/O write requests addressed specifically to logic 8b, and accompanied by data for setting the logic to its enabled and disabled selection states.

Figure 6B:
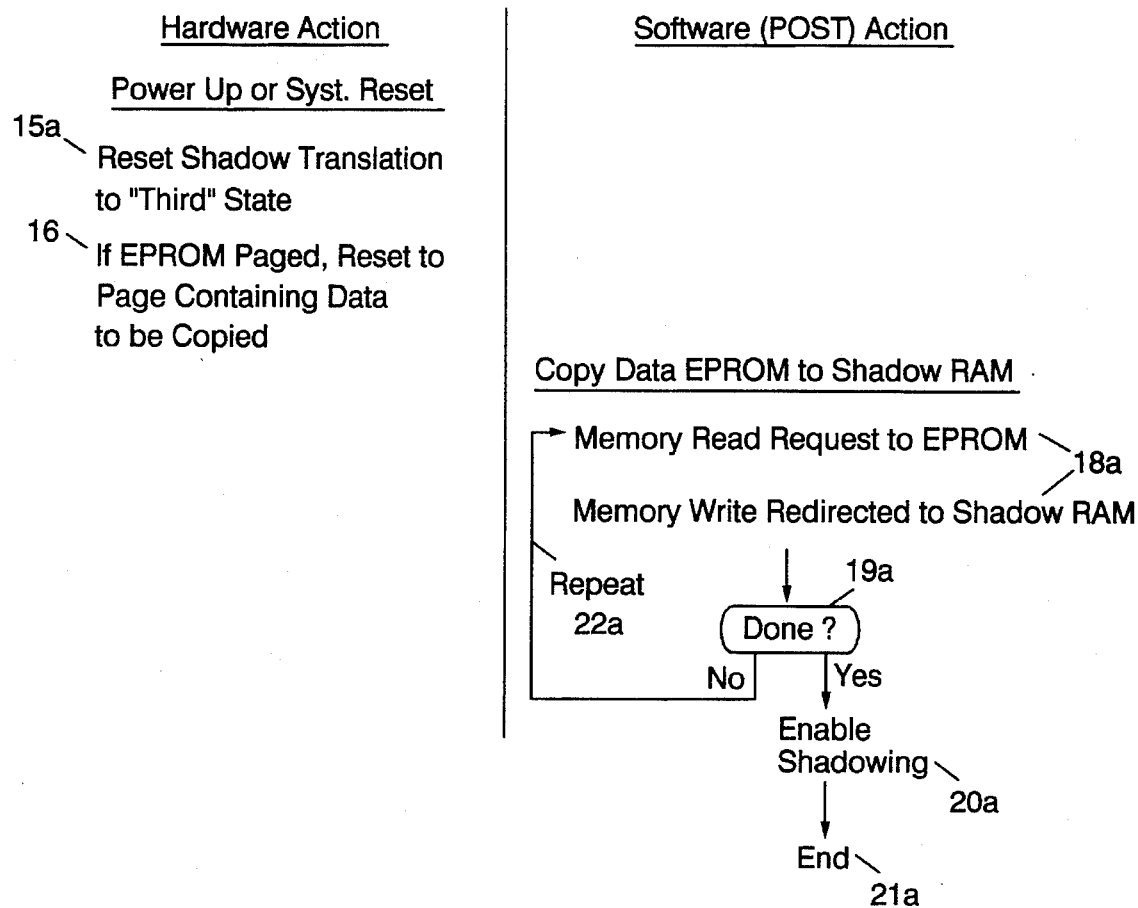

3b. Direct Copying (FIGS. 3 and 6B)

In direct copying, data is moved from EPROM 5 to shadow RAM 6 directly (without intervening storage in memory 7), along a path indicated schematically by heavy lines 3-1 in FIG. 3. For these operations, logic 8a, 8b is initialized by the system reset hardware to a special "third" selection/translation state not previously mentioned (operation 15a, FIG. 6B), and page translation if applicable is initialized by the reset hardware as before (operation 16, FIG. 6B). The third state of logic 8b is accessible only to the reset hardware of the system, and not to system programs (i.e. not to the initialization copying subroutine or to programs used after initialization). In the third state, logic 8b reacts differently to memory read and memory write requests within the address range assigned to the EPROM. Read requests in the assigned range are routed directly to the EPROM, while write requests within the same range are redirected to shadow RAM 6.

With logic 8b continuously in the third state, a copying subroutine 18a–22a (FIG. 6B) is performed (e.g. as part of the system initialization POST). At the completion of this subroutine, which is quite different from the subroutine 18-22 of FIG. 6A, the subroutine sets logic 8b to enabled state before concluding.

In operations 18a, time-staggered memory read and memory write requests are directed to the EPROM, via the path indicated by heavy lines 3-2 (FIG. 3). Since logic 8b is in the above-mentioned third state, the read requests are routed directly to EPROM 5 while the write requests are redirected to RAM 6. Accordingly, data read out of locations in EPROM 5 by the read requests is written into corresponding locations in RAM 6 by succeeding write requests.

At 19a, the subroutine determines if the copying has been completed. If it has been completed, operation 20a is performed to enable shadowing (I/O write to 8b with appropriate data for setting enabled selection state), and the subroutine ends as shown at 21a. If the operation is incomplete at 19a, action 22a is taken to re-enter the routine associated with actions 18a and the latter routine is repeated to copy more (principal) data; these re-entry and repeat copying actions continuing until all of the (principal) data has been copied to RAM 6.

As in the indirect copying process, depending upon the logical capabilities of the system, data read out of the EPROM may either be directly written to RAM 6 or it may be read from the EPROM to (buffers in) processor 1 and then written from processor 1 to RAM 6.

4. EPROM Paging

Figure 4:
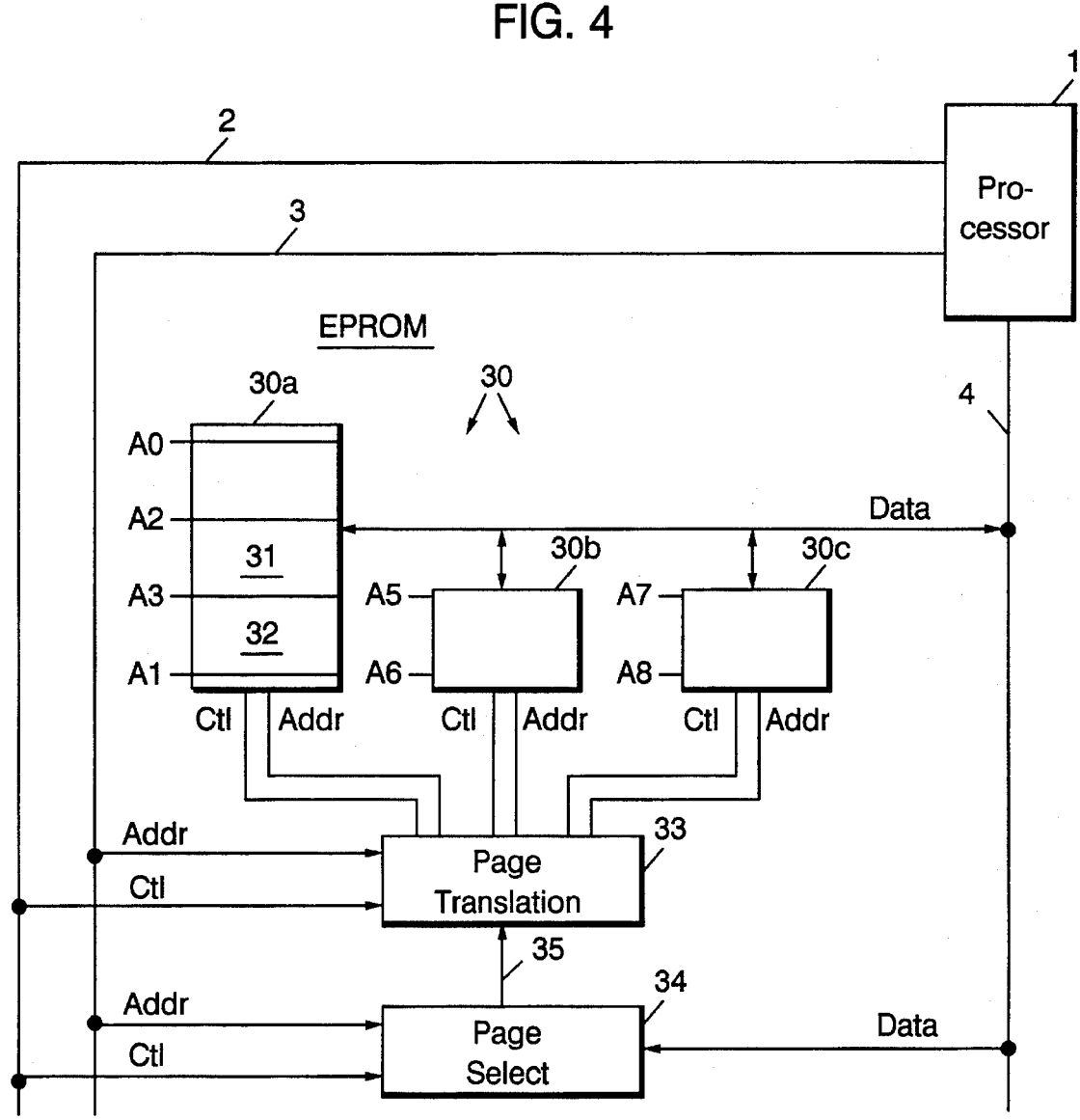
FIG. 4 is a schematic showing a "slow" access memory (EPROM), storing principal and secondary data of a particular form (video BIOS information and principal and secondary fonts mentioned earlier), which is adapted for paging with a special page-mapping feature serving to provide access to the data in a particular manner useful for that data.

FIG. 4 is used to describe how the EPROM of FIG. 1 could be used in a paging mode, but without shadowing, to store more than a single page of data and to provide access to data held in different pages. The data is assumed to be the video BIOS information and font data alluded to earlier, and the EPROM configuration shown here is designed specifically to permit the video BIOS information to be efficiently addressed along with any of the font data.

The EPROM, shown at 30, comprises three physically separate storage sections 30a, 30b and 30c. Section 30a is the size of a full page (e.g. 32K bytes), and portions 31 and 32 therein respectively store the video BIOS program information and a set of principal font data. Sections 30b and 30c are each smaller than a page in size, and each respectively contains secondary font data.

Sections 30a–30c have separate control and address input connections to respective separate signal outputs of page translation logic 33, and common data transfer connections to bus data lines 4. Page translating functions of logic 33 are controlled by multi-state page selection logic 34. Logic 33 has input connections to bus lines 2 and 3, and operates to receive memory read and memory write requests from processor 1.

Section 30a has a physical addressing range A0-A1. Portions 31 and 32 of section 30a have respective addressing ranges A2-A3 and A3-A1 which represent separate sub-ranges of range A0-A1. Thus, elements of the video BIOS information are addressable in range A2-A3, and elements of the principal font data are addressable in range A3-A1. Sections 30b and 30c have respective addressing ranges A5-A6 and A7-A8, each about the same size as subrange A3-A1.

Operations of page translating circuits 33 effectively map physical address ranges A3-A1, A5-A6 and A7-A8 into corresponding page portions of three different logical page spaces, while mapping sub-range A2-A3 into other corresponding portions of each of the logical page space. Thus, the video BIOS information can be addressed within each logical page space along with the font data set mapped to the respective logical page space.

Circuits 33 and 34 each have input connections to bus address and control lines 2 and 3 for receiving addressed requests, and circuit 34 has an input connection to data lines 4 for receiving data signals from those lines.

The bus connections to circuit 34 allow I/O write requests to be directed from processor specifically to that circuit, and cause associated data, sent from the processor on line 4, to be stored in not-shown registers within circuits 34. This allows the processor to programmably set circuits 34 to multiple different page selection states. Output connections 35 from circuits 34 to circuits 33 condition the latter circuits to address translating states associated with current selection state settings of circuit 34.

In each translating state of circuits 33 incoming addresses on bus lines 3 are detected as logical addresses, and circuits 33 respond only to incoming memory read/write requests (represented by signals appearing together on bus lines 2 and 3) which contain logical addresses falling within a predetermined logical page address range established by the current selection setting of circuits 34. Incoming memory read or write requests containing addresses within the currently selected predetermined logical range are translated into corresponding output requests directed specifically to one of the three EPROM sections and to specific storage locations in the selected sections.

In ordinary operations of the system, EPROM 30 is used only in a read-only mode, and the processor will only direct memory read requests to the EPROM. Addresses contained in incoming memory read requests received by logic 33 are selected for translation only if such addresses fall within predetermined upper or lower portions of a logical page range determined by the current state setting of circuits 34. In general, the upper portion will correspond in size to the space physically containing the video BIOS information and the lower portion will correspond in size to the space physically containing a font set. Incoming addresses falling within the currently selected upper logical portion are translated into corresponding physical addresses directed to locations within portion 31 of section 30a, and corresponding requests containing the physical address are applied to section 30a causing BIOS information to be read from that section to bus lines 4 (and transferred thereby to processor 1). Incoming addresses falling within the currently selected lower portion are translated to physical addresses directed to locations in selected ones of portion 32 of section 30a, section 30b or section 30c (which one determined by the current selection setting of circuits 34), and corresponding memory read requests containing the physical addresses are applied to the appropriate one of sections 30a, 30b or 30c; causing font data to be read out of a corresponding location in the respectively selected one of portion 32 of section 30a, section 30b or section 30c.

Depending upon the complexity of circuits 33 and 34, the logical range selected by circuits 33 addressing of the EPROM may be confined either to one logical page range at a time or span several page ranges at a time. If confined to one logical page space at a time, circuits 33, 34 must be configured to effectively map each logical space to a physical space containing the video BIOS information and one of the font sets. If confined to plural page spaces at a time, the video BIOS information and font data can be mapped to different logical pages.

It should be understood that paging per se is and has for many years been well known in the art of memory usage, and is not per se considered to be novel herein. However, use of paging in the context and configuration just described, and in conjunction with shadowing circuits to be described (relative to FIG. 5) is considered novel.

5. Use Of Paged EPROM With Reversible Shadowing

Figure 5:
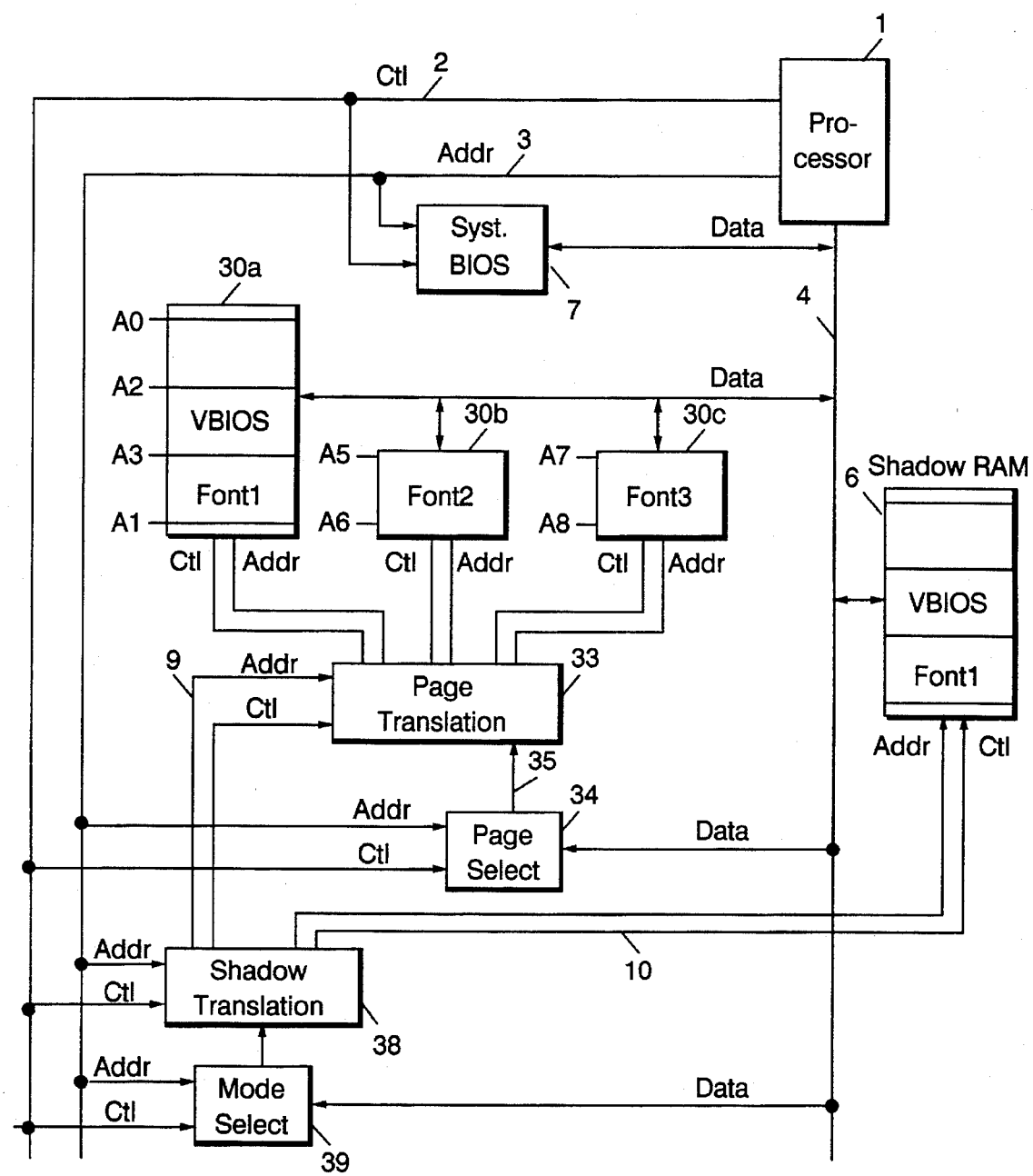
FIG. 5 is a schematic for explaining how the paged EPROM arrangement of FIG. 4 used in conjunction with shadowing, in accordance with the present invention, when only the principal data is copied to shadow RAM.

FIG. 5 shows the paging configuration described above as used in conjunction with a shadowing arrangement. In this arrangement, the principal data (e.g. video BIOS and a principal font) and secondary data (e.g. secondary fonts) are stored in a paged EPROM 30, and only the principal data is copied to the shadow RAM 6 when the system is initialized. Shadow translation logic 38 controls access to both the EPROM 30 and shadow RAM. Mode select logic 39 controls the translation operation of logic 38.

As in FIG. 4, the EPROM 30 has associated access logic 33 (page translation logic) and 34 (page selection). However, unlike the arrangement in FIG. 4, page translation logic 33 receives its request signals from shadow translation logic 38, rather than directly from bus lines 2 and 3.

Mode select logic 39 and page select logic 34 have direct connections to bus lines 2-4, so that selection states of these circuits can be set by I/O write requests sent from processor 1. For such operations, processor 1 operates under control of a system services BIOS program (hereafter "system BIOS") stored in "other" memory 7.

As is presently well known in the art, system BIOS is used by system processors to direct performance of numerous basic I/O data signalling functions relative to system memory management, peripheral control and other control components. Such components are assigned addresses within a predefined I/O address space (e.g. at system setup after component installation), and, when required, system BIOS dispatches I/O read and I/O write request signals to such components at their respective addresses. The overall procedure for this is presently well understood in the computer system arts.

In respect to the arrangement shown here, system BIOS is adapted to be able to dispatch I/O write request signals to logic 39, for setting that logic in disabled and enabled states, and to dispatch I/O write request signals to logic 34 for setting that logic in various different page selecting states.

In disabled state, logic 39 conditions logic 38 to route memory read (or write) requests, having addresses within a range preassigned to EPROM 30, directly to EPROM page translating logic 33. In enabled state, logic 39 conditions logic 38 to redirect received memory read/write requests to shadow RAM 6; where not shown address decoding logic causes data to be read or written from a specific storage location corresponding to the incoming address.

While logic 38, 39 is disabled, logic 33 acts to steer incoming memory read or write requests to a selected one of the three EPROM sections 30a, 30b, or 30c; where not-shown address decoding logic causes data to be read from or written to a specific storage location in the respective section. The specific location is determined by the incoming address value, and the section selected is determined by the current page selection state of logic 34 and the current address value. As in FIG. 4, the translation function is so mapped that in any one state of logic 34, access is available to all of the video BIOS principal data and font data in a selected one of the three font sets: font 1 (principal), font 2 (secondary) or font 3 (secondary).

Described next are system processor operations associated with the calling of system BIOS, the operations of that program element for dispatching shadow enabling and shadow disabling I/O write requests to logic 8b (FIG. 1) or logic 39 (FIG. 5), and the signal paths affected by such operations in the configuration of FIG. 5.

6. System BIOS Usage

Figure 7:
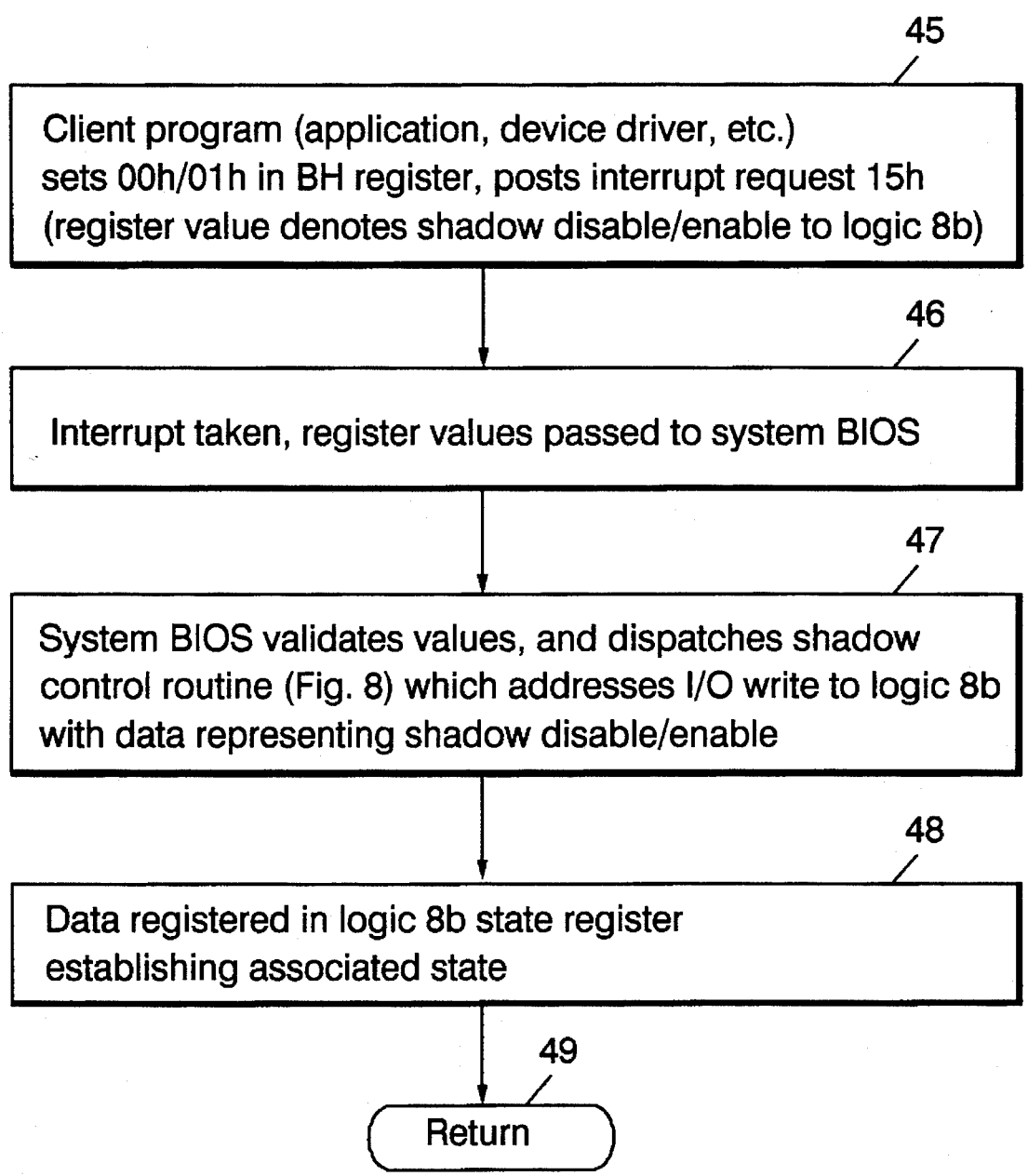
FIG. 7 shows how system software directs enabling and disabling of shadowing, in accordance with the present invention, by means of function calls to system BIOS.
Figure 8:
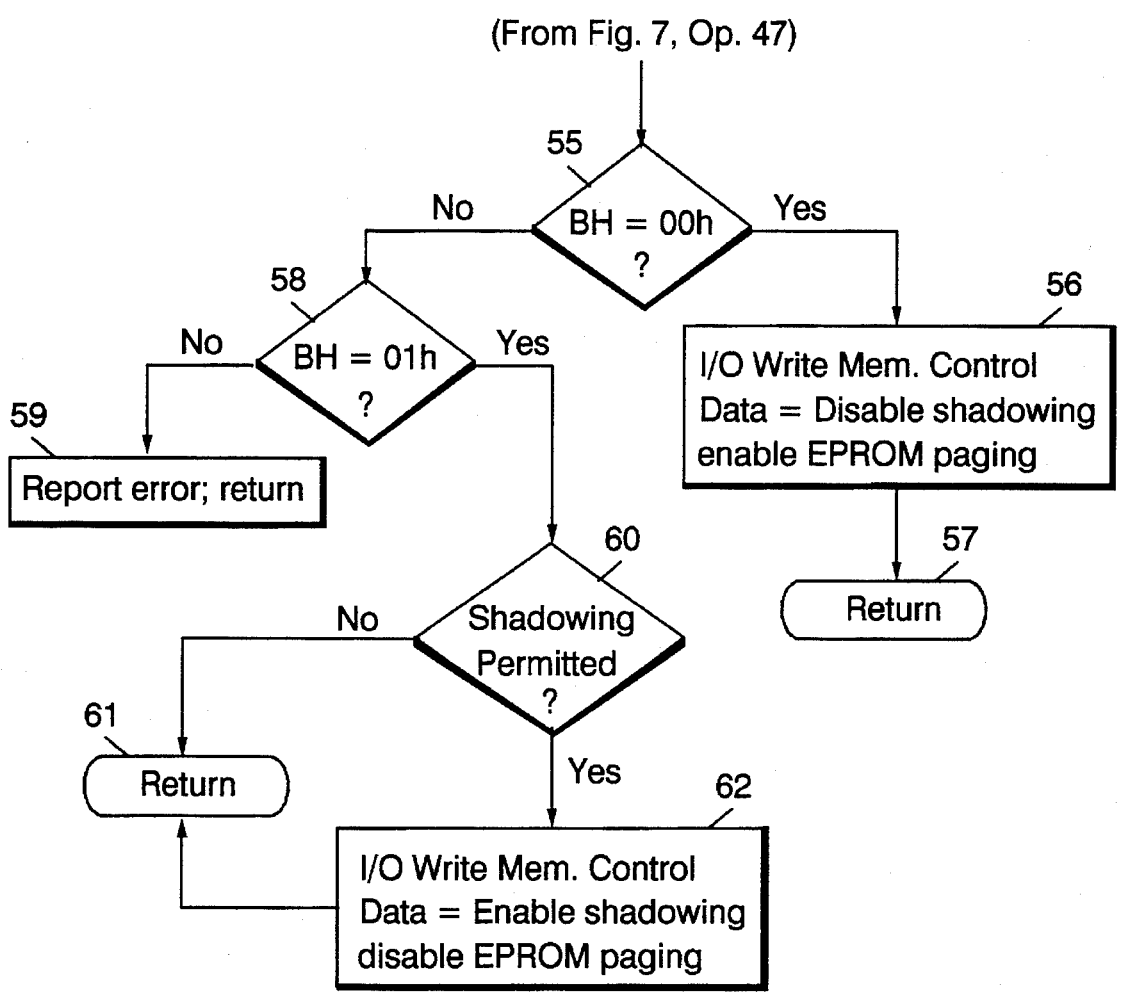
FIG. 8 diagrams details of a portion of the process characterized in FIG. 7.

System BIOS usage is characterized in FIG. 7, and system BIOS operations associated with transfer of I/O write requests to the shadowing mode select logic (39, FIG. 5, or 8b, FIG. 1) are shown in FIG. 8. Other operations, e.g. those associated with dispatch of page selecting I/O write requests to logic 34 (FIG. 5), are easily understood from the following discussion.

As shown at 45 (FIG. 7), system programs (e.g. applications, device drivers, operating system routines, video BIOS routines, etc.) communicate with system BIOS by setting information into predefined processor registers and posting a special interrupt request associated with system BIOS. In respect to dispatching a function call for altering the current shadowing mode, calling program sets a hex value 00h or 01h into the BH register (00h to call for disabling shadowing, and 01h to call for enabling shadowing).

When the interrupt is taken, e.g. by an operating system supervisory program, a system BIOS routine is invoked and the register values are passed to that routine (operation 46, FIG. 7). System BIOS performs certain preliminary functions to validate the register values, and, if the values are consistent with the functions associated with the respective register, a system BIOS subroutine is called to complete the handling of the requisite signalling process (operation 47, FIG. 7). If the values are inconsistent or erroneous, an error is posted and control is returned to the system supervisor.

The particular register values received and validated in these operations, cause the BIOS to dispatch a subroutine (FIG. 8) that is responsible for the I/O write signalling action needed to alter the enabled/disabled state of shadow mode selection logic 8a of FIG. 1 (or, equivalently, logic 39, FIG. 5). However, those skilled in the art will understand that a process similar to that characterized in operations 45-47, involving an interrupt 15h based on different register parameters, is used for dispatching other I/O write actions (e.g. actions for writing new page selection data to logic 34, FIG. 5). In the absence of other errors, the subroutine of FIG. 8 culminates in transfer of an I/O write request, and associated shadow state data, to bus 2-4, causing logic 8b/39 to be set to a designated disabled or enabled shadowing state (operation 48, FIG. 7), and the BIOS program returns control to the system supervisor (49, FIG. 7).

Referring to FIG. 8, the system BIOS subroutine for shadow disablement/enablement conditions its actions in part on the register value passed in the earlier interrupt. When the register value is passed through processor register BH, the subroutine determines (operation 55) if the respective value is one calling for shadow disablement (BH=00h). If it is, actions 56 (discussed further below) are taken to dispatch the I/O write signal for setting the disabled mode, and control is returned to the system supervisor (57, FIG. 8). If the register is BH and its value is not 00h, the subroutine determines (action 58) if the value is 01h (the value calling for shadow enablement). If the register is BH and its value is neither 00h nor 01h, an error report is posted and control is returned to the system supervisor (action 59).

If the value examined at 58 is 01h, the subroutine determines if the system is configured for shadowing (operation 60, "shadowing permitted"). If shadowing is not permitted, no further action is taken and control is returned (action 61). If shadowing is permitted, actions 62 are taken to transfer an I/O write request to logic 8b/39 with appropriate data for establishing the enabled state, and then control is returned to the system supervisor via action 61.

Relative to the paged EPROM configuration of FIG. 5, action 56 (disable shadowing), also sets a logical mode in shadow translation logic 38 (FIG. 5) to enable paging; i.e. to allow requests to be forwarded through logic 38 to logic 33, FIG. 5. Similarly, action 62 (to enable shadowing) also disables paging; i.e. disables the signal path from logic 38 to logic 33 in FIG. 5.

In order to actually perform the I/O write transfer of action 56 or 62, the BIOS subroutine performs a table lookup to determine the I/O address of logic 8b/39. As noted earlier, a unique I/O address is assigned to each component attached to the system when the system is either initially set up or an additional component is installed. As part of the system setup process, an identity (ID) function unique to each component is examined by the system setup software, and an I/O address value associated with that ID is stored in a table in a nonvolatile (e.g. CMOS) memory. The subject BIOS routine associates the register value 00h/01h with the identity of the memory management component that controls shadowing (logic 8b/39) and performs a table lookup to retrieve the associated I/O address. The information stored in the table, also indicates the data that is needed to set the required disabling or enabling state, and that data is retrieved. An I/O write request is then signalled on the bus to the retrieved address, and it is accompanied by the retrieved data which establishes the requisite state.

7. Signal Path Effects of Shadow Enabling and Disabling

Figure 9:
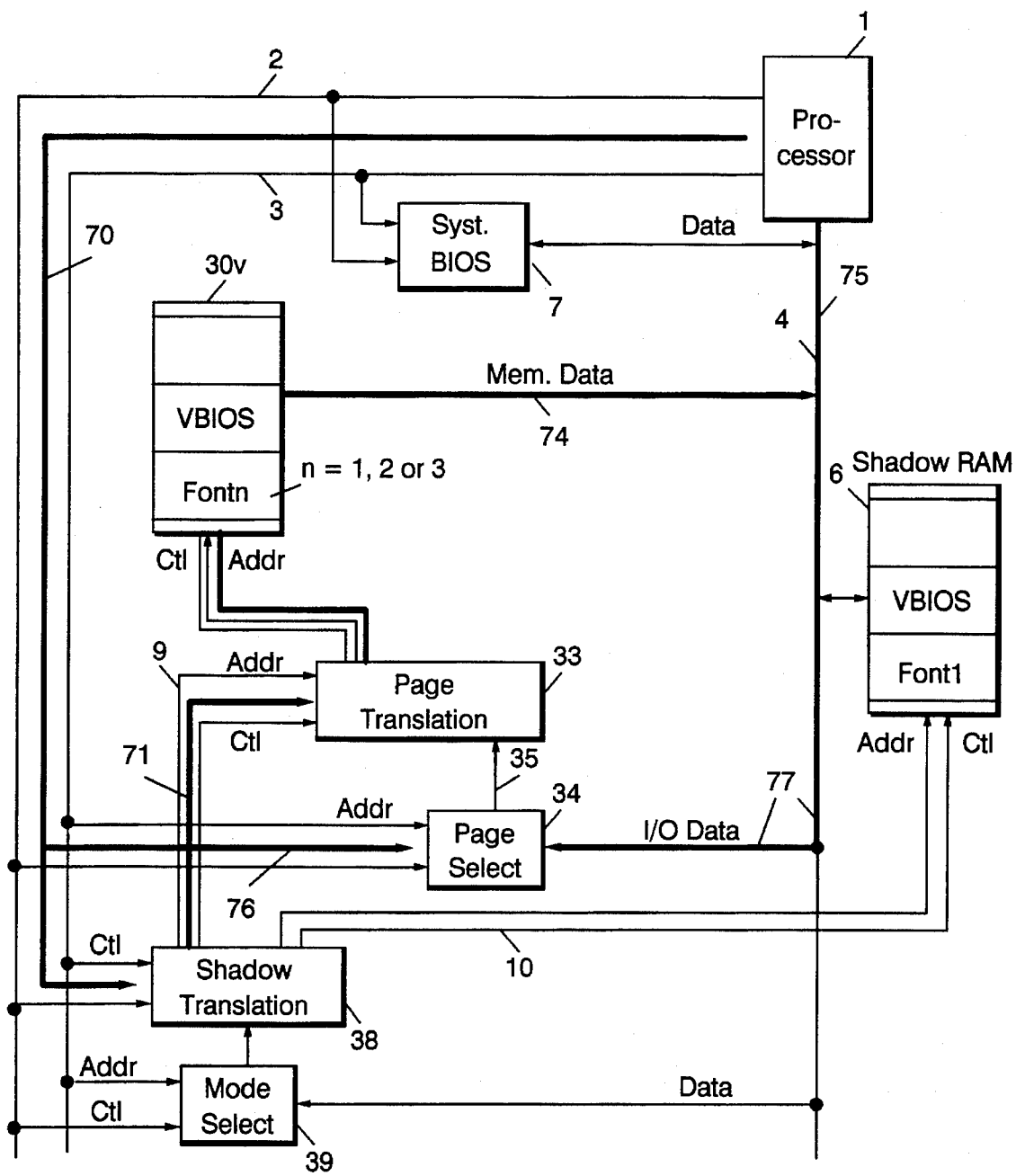
FIG. 9 is a view of the system organization of FIG. 5 showing primary signal paths and logical layout of EPROM when shadowing is disabled.

FIG. 9 shows the virtual configuration of the EPROM/shadow RAM memory arrangement of FIG. 5, when shadowing is disabled. FIG. 10 shows the virtual configuration of the same arrangement when shadowing is enabled.

a) Shadowing Disabled (FIG. 9)

When shadowing is disabled, memory read requests (e.g. requests issued by processor 1 as part of its application program handling), having address values in a range preassigned to EPROM 30, are routed to shadow translation logic 38 through the signal path indicated by thick line 70, and steered by that logic to page translation logic 33 via the path shown by thick line 72.

The current state of page selection logic 34 conditions translation logic 33 so that storage locations in the EPROM that are instantaneously accessible are effectively mapped into a single virtual page configuration shown at 30v (FIG. 9). This virtual page spans the physical storage locations in the EPROM which contain the video BIOS information (VBIOS; see space 31 FIG. 4 in physical section 30a) and one of the three sets of font data: font data set n (n=1, 2 or 3). Memory read requests having addresses in a predetermined high subrange are routed to 30v locations containing the VBIOS information (bytes or words), and requests having addresses in a lower subrange are routed to 30v locations containing font n data (bytes or words). In response to such requests, (video BIOS or font n) data is read out of the addressed physical location and transferred to processor 1 via the path shown by thick lines 74 and 75 (FIG. 9).

Relative to the physical sections 30a–30c, address and request information received by logic 33 is routed to one of the three sections, in accordance with the current virtual page mapping, and not-shown address decoding logic associated with each section decodes the received address to cause reading of data at a corresponding physical location in that section.

Of course, the current page selection state of logic 34 is alterable by programs running on processor 1; via interrupts such as 15h discussed above and associated system BIOS operations serving to transfer I/O write requests to an I/O address assigned to logic 34 via the bus request path indicated by thick line 76 and the bus data path indicated by thick lines 75 and 77.

b) Shadowing Enabled (FIG. 10)

When shadowing is enabled, memory read requests in the address range preassigned to EPROM 30 are redirected to shadow RAM 6. The requests are applied to logic 38 via the bus path indicated by thick line 80, and redirected via the extension path indicated by thick line 81. As noted earlier, shadow RAM 6 is initialized to store a copy of the principal data stored in the EPROM; in the example, a copy of the VBIOS information and the data in principal font set 1. Accordingly, the address in the memory read request. which is one directed either to a particular element of VBIOS information or a particular element of font 1 data, is translated to a corresponding address relative to RAM 6. That address is applied to not-shown address decoding logic in RAM 6 which causes data to be read out of a physical location in RAM 6 corresponding to the address.

I claim:

1. A memory arrangement for a computer system wherein input-output operations of said system are controlled by a system BIOS (Basic Input Output System) program that interprets function calls generated by bigher level system programs, said higher level system programs including operating system programs, device driver programs and application programs; said memory arrangement comprising:

addressable first and second random access memory devices having different access delay attributes; said second device having a shorter access delay than said first device; said first device being a non-volatile device permanently storing principal and secondary data, and said second device being a volatile device that is dedicated exclusively for storing a copy of only said principal data stored in said first device when said computer system is initialized; said principal data consisting of data likely to be frequently accessed during operation of said computer system, and said secondary data consisting of data likely to be less frequently accessed than said principal data during operation of said computer system;

address translating means coupled between said computer system and both said first and said second memory devices; said address translating means having different first and second states of operation characterized in that when said address translating means is in said first state addresses received by said address translating means, and having values in a predetermined range associated with the entire capacity of said first device, are applied only to said first device, leaving said second device virtually inacessible, and when said translating means is in said second state, addresses in said predetermined range are redirected to said second device leaving said first device virtually inaccessible; and means controlled by said system BIOS program, in response to predetermined first and second function calls from said higher level system programs after said computer system has been fully initialized, for toggling said address translating means respectively between said first and second states; wherein said principal data can be made accessible to said higher level system programs with relatively short access delays, while said address translating means is in said second state in which it redirects addresses in said predetermined range only to said second device, and wherein both said principal data and said secondary data can be made accessible to said higher level system programs with relatively long access delays, while said address translating means is in said first state in which addresses in said predetermined range are directed only to said first device.

2. A memory arrangement in accordance with claim 1 wherein:

a copy of said principal data is transferred from said first device to said second device during initialization of said computer system, and said copy is thereafter permanently retained by said second device in a volatile form, until power to said computer system is turned off; and said address translating means is set to said second state after said transfer of said principal data to said second device, and appears in said second state when said computer system is fully initialized, causing addresses supplied by said computer system in said predetermined range to be redirected exclusively to said second device immediately after initialization of said system.

3. A memory arrangement in accordance with claim 1, wherein said computer system has a predetermined virtual memory address space organized into discrete virtual pages, and wherein:

said first memory device contains a bank of plural separately accessible memory units, said bank being mapped by said computer system into a single one of said virtual pages although physically containing more than a single page of storage capacity, and said first memory device contains addressing controls which are programmably set by said computer system to selectively direct addresses within said single one of said virtual pages to physical locations in different ones of said plural memory units; said addressing controls of said first memory device receiving addresses from said address translating means only when said address translating means is set to said first state, and then receiving only addresses directed to said single one of said virtual pages; and said address translating means, when in said second state, detects and translates addresses within said single one of said virtual pages in order to redirect any address in said single one of said virtual pages to an associated physical location in said second memory device.

4. A memory arrangement in accordance with claim 3 wherein:

said principal and secondary data stored in said first memory device are organized for addressing purposes into first and second subsets of data occupying discretely separate portions of said single one of said virtual pages, said first subset consisting of a predetermined portion of said principal data, and the second subset consisting of the remainder of said principal data and said secondary data; said predetermined portion of said principal data occupying a first one of said plural memory units forming said bank, said remainder of said principal data occupying a second one of said plural memory units, and said secondary data occupying one or more additional ones of said plural memory units; and said addressing controls of said first memory device are preset by said system, in advance of access to said first memory device, to steer virtual addresses directed to the portion of said virtual page containing said predetermined portion of said principal data to corresponding physical locations in said one of said memory units containing said principal data, while steering virtual addresses directed to the portion of said virtual page containing said remainder of said principal data and said secondary data to a selected location in one only of said second and additional ones of said memory units;

wherein, when said address translating means is set to said first state, the data in said first subset is always accessible, but only a portion of the data in said second subset is coincidentally accessible; said coincidentally accessible portion of data in said second subset being either said remainder of said principal data or a selected part of said secondary data.

5. A computer system, containing processor and random access memory subsystems, wherein input-output operations of said processor subsystem are controlled by a system BIOS (Basic Input Output System) program that interprets function calls furnished by higher level system programs; said higher level system programs including operating system programs, device driver programs and application programs; said memory subsystem including:

first and second discretely addressable random access memory units having different access time attributes, said second memory unit having a faster access time than said first memory unit; said first memory being non-volatile and permanently storing discrete first and second sets of data, wherein data in said first set represents data likely to be accessed frequently during programmed use of said system and data in said second set represents data likely to be accessed much less frequently than data in said first set during said programmed use; said second memory unit being a volatile memory unit dedicated for storing a copy of only said first set of data when said system is powered up and fully initialized;

first address translating means for selectively directing addresses furnished by said processor subsystem, in a predetermined addressing range associated with both said first and second memory units, to a selected one of said first and second memory units; said first address translating means being responsive to control signals supplied by said processing subsystem, said control signals being originated by said system BIOS program, for toggling between enabled and disabled operating states determining the addressing of said first and second memory units; said first address translating means operating while in said enabled state to translate first address signals in said predetermined addressing range into corresponding second address signals physically associated with said second memory unit and to route said corresponding second address signals to said second memory unit; said first address translating means operating while in said disabled state to transfer said first address signals unchanged directly to said first memory unit;

and wherein said processor subsystem includes:

means for initializing said memory subsystem in a configuration in which said second memory unit stores a copy of said first set of data, and said first address translating means is set to said enabled state; and means controlled by said system BIOS program, in response to predetermined first and second function calls issued by said higher level programs after initialization of said computer system, for selectively toggling said first address translating means between said enabled and disabled states;

wherein said first address translating means can be toggled from its said initalized enabled state to said disabled state, in order to provide said higher level programs with slow access to data in both said first and second sets of data via said first memory unit, and said first address translating means can be toggled back to said enabled state in order to provide said higher level programs with quick access to only said copy of said first set of data stored in said second memory unit.

6. A computer system in accordance with claim 5 wherein:

storage locations in said first memory unit which respectively contain said first and second sets of data are mapped by said processor subsystem into a plarality of virtual page address spaces;

said first set of data is organized into first and second subsets of data characterized in that the data in said first subset of data is stored in locations in said first memory unit which are mapped into a portion of each of said virtual page address spaces, and in that the data in said second subset and the data in said second set are stored in locations in said first memory unit which are mapped into remaining portions of different ones of said virtual page address spaces;

and wherein said memory subsystem comprises second address translating means connected between said first address translating means and said first memory unit for translating individual addresses directed in said virtual page address spaces into addresses uniquely directed to corresponding physical locations in said first memory unit containing one only of said first subset of data, said second subset of data, and said second set of data;

wherein addresses directed to locations in any of said virtual page address spaces can be used to uniquely address physical locations in said first memory unit that contain all of the data in said first subset and the data in one only of said second subset and said second set.

7. A computer system in accordance with claim 6, wherein:

said first set of data comprises video BIOS program information, for controlling formation of displayable images in said processor subsystem, and font data representing a principal font for defining attributes and forms of symbols displayed by said video BIOS program; said video BIOS program information constituting said first subset of data, and said principal font data constituting said second subset of data; and said second set of data comprises other font data different from said principal font data and representing secondary fonts for defining attributes for said displayed symbols different from the attributes defined by said principal font data.

8. A computer system in accordance with claim 7 wherein:

said video BIOS program information is stored in locations in said first memory unit that are mapped into a portion of each of said virtual page address spaces; and said data representing said principal font data and said other font data are stored in locations in said first memory unit that are mapped into remaining portions of different ones of said virtual page address spaces;

wherein said video BIOS program information is made accessible to said processor subsystem, along with a selected one of said principal font data and said other font data, when said processor subsystem addresses any one of said virtual page address spaces.

9. A shadow memory arrangement for a computer system controlled by a system BIOS (Basic Input-Output System) program that interprets function calls issued by higher level programs including application programs, said arrangement comprising:

a nonvolatile first random access memory device having a predetermined first access delay attribute, and a volatile second random access memory device having a predetermined second access delay attribute shorter in duration than said first access delay attribute, said second memory device configured for use as a shadow RAM relative to said first memory device; said first memory device comprising discrete first and second storage sections each containing data subject to usage by programs runnning on said computer system; data in said first section representing data likely to be frequently accessed by said programs running on said computer system and data in said second section representing data likely to be infrequently accessed by said programs running on said computer system; said second memory device being dedicated during powered operation of said system for storing a copy of only said frequently accessed data stored in said first section of said first memory device and being conditioned at initialization of said system to receive addresses directed to either said first or second section of said first memory device so that said copy of said frequently accessed data stored in said second device is quickly accessible to said higher level programs upon initialization of said computer system; and means controlled by said system BIOS program, in response to predetermined function calls issued by said higher level programs, for modifying said initialized conditioning of said second memory device to permit said addresses directed to said first and second sections of said first memory device to be applied directly to respective sections of said first memory device, and thereby permit slow access to said infrequently accessed data stored in said second section of said first memory device as well as slow access to said frequently accessed data stored in said first section of said first memory device.

10. A shadow memory arrangement in accordance with claim 9 wherein said means controlled by said system BIOS program includes:

address translating means for controlling addressing of said first and second memory devices; said address translating means having first and second different operational states characterized in that:

in said second state, said address translating means detects addresses within a first range of addresses associated with storage locations in said first memory device, translates said detected addresses into corresponding addresses associated with storage locations in said second memory device, and routes said translated addresses to said second memory device; and in said first state, said address translating means detects said addresses within said first range and routes them directly to said first device;

said address translating means being set to said second state when said computer system is initialized; and means coupled to said address translating means, and responsive to signals produced by said system BIOS program, after initialization of said computer system and in response to predetermined function calls from said higher level programs, for toggling said address translating means between said second and first states.

11. A shadow memory arrangement in accordance with claim 10 for a computer system wherein memory is mapped into a virtual address space containing multiple pages, and wherein:

said first memory device contains plural pages of storage capacity, and has associated therewith page translating logic controllable by said computer system for selectively steering addresses received from said address translating means to physical storage locations in various different page portions of the physical storage capacity of said first memory device; and said page translating logic of said first memory device can be conditioned by said computer system to route addresses directed to a first predetermined set of logical storage locations within different said pages of storage capacity in said first memory device to one common set of physical storage locations in said first memory device, while routing addresses directed to other than said first set of logical locations to distinctly separate physical storage locations in said first device; wherein address signals routed from said address translating means to said page translating logic of said first memory device, when said address translating means is toggled to said first state, can be used to access either data contained only in said first section of said first memory device or data contained in both said first and said second sections of said first memory device.

* * * * *